Patented Feb. 14, 1950

2,497,579

UNITED STATES PATENT OFFICE 2,497,579

CARBOHYDRATE PRESERVATIVE

Edward A. Bried, Newport, Del., assignor to Hercules Powder Company, Wilmington, Del., a corporation of Delaware No Drawing. Application December 26, 1947, Serial No. 794,104

12 Claims. (Cl. 260—209)

This invention relates to the preservation of solutions containing putrefactible materials and more particularly to aqueous solutions of carbohydrates preserved from putrefaction by the addition of a stabilized rosin amine.

Aqueous solutions of carbohydrates have many industrial applications as, for example, starch solutions which are used for sizing paper and various textiles. Usually these solutions must be made and used immediately because on storage the solutions will putrefy and ferment due to bacterial action which results in the hydrolysis of the starch molecule. Various preservatives have been suggested for use in aqueous carbohydrate solutions in an attempt to prevent putrefaction but these prior art preservatives have been either highly odorous compounds which cannot be used for many applications or they have been volatile compounds such as toluene and chloroform.

Now in accordance with this invention it has been found that putrefactible materials such as aqueous solutions of carbohydrates may be preserved by the addition of a stabilized rosin amine or a salt thereof. The rosin amine prevents the growth and deleterious action of microorganisms and, as a result, the carbohydrate molecule is not hydrolyzed or otherwise degraded by the microorganism and, thus, the viscosity of such solutions or dispersions is not decreased. The use of a rosin amine as a preservative for these solutions has the additional advantage of being odorless and consequently contributing no odor to the solution and, at the same time, preventing the formation of an unpleasant odor due to the putrefaction of the material.

The following examples illustrate the preservation of aqueous carbohydrate solutions by the addition of a stabilized rosin amine or salt thereof. All parts and percentages are by weight unless otherwise indicated.

Example 1

Solutions of commercial pearl corn starch were prepared by agitating the starch for 15 minutes in tap water at a temperature of 80° C. To portions of these solutions were added dehydrogenated rosin amine, dehydrogenated rosin amine acetate, and hydrogenated rosin amine acetate. These solutions were then exposed to the atmosphere and the odor, pH and viscosity were noted at periodical intervals. The following table shows the effect of adding these preservatives to various concentrations of the starch solution. The amount of preservative added is expressed as the per cent of the weight of starch in the solution.

| Concentration of Starch Solution | Preservative | Percent of Preservative Added | Days Effective |
|---|---|---|---|
| Percent | | | |
| 20 | none | | 2 |
| | dehydrogenated rosin amine | 10 | 60+ |
| 5 | none | | 2 |
| | dehydrogenated rosin amine | 1 | 70+ |
| | dehydrogenated rosin amine acetate | 1 | 70+ |
| 2 | none | | 2 |
| | dehydrogenated rosin amine acetate | 1 | 60+ |
| | ----do---- | 0.5 | 44+ |
| | hydrogenated rosin amine acetate | 0.5 | 34+ |
| | dehydrogenated rosin amine acetate | 0.25 | 14 |
| | hydrogenated rosin amine acetate | 0.25 | 34 |

In the above table the plus sign (+) after the number of days effective indicates that the preservative would presumably be effective for a longer period of time but that the experiment was not extended beyond the number of days indicated. In all cases where the rosin amine compound was added there was no change in odor or pH of the solutions nor was there any material decrease in the viscosity. In fact, in some instances there was a slight increase in viscosity, probably due to the loss of water from the solution by evaporation.

Example 2

A starch solution containing 4.5% starch was prepared as described in Example 1. To three portions of this solution was added an amount of SAE 10 motor oil equal to 10% of the starch solution. In two of these, 0.5% (based on the weight of the starch) of dehydrogenated rosin amine stearate and dehydrogenated rosin amine naphthenate, respectively, was dissolved in the oil and the third was kept as a control, no preservative being added. The starch-motor oil mixtures were then exposed to the atmosphere. The two containing the rosin amine preservatives were still free from putrefaction or fermentation at the end of 39 days, whereas the control sample containing no preservative had spoiled in 7 days.

Example 3

Dehydrogenated and hydrogenated rosin amine acetates were tested for their ability to preserve solutions of mono- and di-saccharides by adding them to aqueous solutions of carbohydrates to which yeast had been added. Stock solutions of dextrose and sucrose were prepared containing 6% of the carbohydrate and 0.5% of yeast. To a portion of each of these solutions was added 1% of dehydrogenated rosin amine acetate and to a second portion of each was added 1% of hydrogenated rosin amine acetate. These solutions were then allowed to stand and were observed for signs of fermentation, and compared with a sample of each of the stock solutions to which no preservative was added. Both of the control solutions fermented after 3 days, whereas the solutions containing a rosin amine salt were still stable after 21 days. In fact, the rosin amine salts had not only prevented the action of the enzymes on the sugars but had also prevented the growth of the yeast.

Any stabilized rosin amine or salt thereof may be used as a preservative for carbohydrates in accordance with this invention. These preservatives are particularly effective for preventing the putrefaction of aqueous solutions or dispersions of the carbohydrates. The rosin amines are effective for preserving aqueous solutions or dispersions of mono-, di-, or poly-saccharides as, for example, the starches such as those from corn, potato, tapioca, sago, arrowroot, rice, wheat, etc., or other polysaccharides such as water-soluble gums, degraded or hydrolyzed cellulose, or various sugars such as dextrin, dextrose, sucrose, fructose, etc.

The carbohydrate material which is treated with the stabilized rosin amine is usually dissolved or suspended in water, since it is these aqueous materials which are most subject to putrefaction, there being little or no putrefaction in the anhydrous material. However, the rosin amine may be added to the dry carbohydrate to prevent putrefaction which occurs due to the presence of moisture. The addition of a stabilized rosin amine or water-soluble salt thereof is particularly useful in the preservation of starch solutions used for sizing paper or textiles. The starch solution may be a cold swelling starch, thin boiling starch, chemically-treated starch, soluble starch, attrition starch or converted starch. Another important application of the addition of a rosin amine to starch is in starch-based drilling muds. These muds are recirculated during the drilling operation and in being so exposed to air are exposed to bacteria which cause the putrefaction of the starch in the mud. In the past, attempts were made to avoid such putrefaction by raising the pH of the mud high on the alkaline side, which then upset the stability of the dispersion. Example 2 above illustrates how the addition of a rosin amine compound prevents the putrefaction of a drilling mud admixed with oil just as would be encountered in actual use. This example also illustrates that the rosin amine compound does not have to be dissolved in the starch solution in order to preserve it from putrefaction.

Any stabilized rosin amine or salt thereof may be used as the preservative for carbohydrate materials. The rosin amines which may be used are the amines of stabilized rosins, such as those of dehydrogenated or disproportionated rosin, polymerized rosin or hydrogenated rosin. If desired, the amines of the pure resin acids, such as dehydroabietylamine, hydroabietylamine, etc., may be used. By the term "stabilized rosin amine" is meant a rosin amine having the ring structure of a stabilized rosin acid, such as dehydroabietic acid, dihydroabietic acid, tetrahydroabietic acid, polyabietic acid, or a mixture of such rosin amines.

The stabilized rosin amines used as preservatives in accordance with this invention may be prepared by reacting ammonia with a stabilized rosin to form the nitrile and then hydrogenating the nitrile to form the amine. The preparation of the nitrile may be carried out by passing gaseous ammonia into the molten rosin material and vaporizing the water as fast as it is formed in order to remove the water from the reaction mixture. The nitrile may also be prepared by heating the rosin material with ammonia in the presence of a dehydration catalyst. In either case, the nitrile should be purified by neutralization or distillation before subjecting it to hydrogenation to prepare the amine, as the presence of acidic materials frequently deactivates the hydrogenation catalyst.

The resin acid nitriles prepared from the stabilized rosins are then hydrogenated to prepare the amine. The hydrogenation may be carried out in the presence or absence of ammonia. Likewise, a solvent may be used in the reaction but is not necessary. Any active hydrogenation catalyst may be used as, for example, an active base metal catalyst such as nickel, cobalt, Raney nickel, Raney cobalt, etc., a noble metal catalyst such as active platinum, palladium, palladium on carbon, or reduced platinum oxide. The reaction is usually carried out at a pressure of from about 200 to 8000 pounds per square inch and at a temperature of from about 20° C. to about 200° C.

The stabilized rosin amines may also be used in the form of their salts. The salts are readily prepared by adding an acid of the desired anion to the rosin amine either in the presence or absence of a solvent for the reaction. In some cases the salts are more easily prepared by a metathesis reaction between a rosin amine salt, such as the acetate, and a suitable alkali metal salt. As examples of the salts of rosin amines, which may be used in accordance with this invention, may be mentioned the hydrochloride, hydrobromide, phosphate, sulfate, borate, oxalate, formate, acetate, chloroacetate, bromoacetate, propionate, chloropropionate, butyrate, oleate, laurate, stearate, benzoate, salicylate, phthalate, resinate, naphthenate, etc., and the metal complex salts of the amines.

The stabilized rosin amine or salts thereof may be incorporated with the carbohydrate in any convenient manner. In adding the amine itself or a water-insoluble salt of the amine to an aqueous solution or dispersion of carbohydrate, it may be desirable to dissolve the rosin amine in a water-miscible solvent such as alcohol or acetone in order to insure uniform distribution of the rosin amine in the aqueous phase. However, if sufficient agitation is used, the amine can be incorporated without the use of an organic solvent. On the other hand, as illustrated in Example 2 above, the amine or salt may be dissolved in an oil which is then in contact with the aqueous phase. In the case of the water-soluble salts of the rosin amines, the salt may readily be dissolved directly in the aqueous phase.

The amount of the stabilized rosin amine or salt thereof to be added to the carbohydrate material depends upon the degree of preservation desired. For example, when preservation is required for only short periods of time, up to about 15 days, 0.25% to 0.5% of rosin amine based on the amount of carbohydrate is sufficient. For longer periods of storage, about 1% to 10% of the rosin amine based on the weight of the carbohydrate material may be desired. However, for most purposes about 1% of the rosin amine is sufficient.

What I claim and desire to protect by Letters Patent is:

1. A new composition of matter comprising a carbohydrate and a preservative therefor selected from the group consisting of a stabilized rosin amine and the salts thereof said preservative being present in an amount within the range of about 0.25 and 10% of the weight of said carbohydrate.

2. An aqueous solution of a carbohydrate containing a preservative for the carbohydrate selected from the group consisting of a stabilized rosin amine and the salts thereof said preservative being present in an amount within the range of about 0.25 and 10% of the weight of said carbohydrate.

3. An aqueous dispersion of a carbohydrate containing a preservative for the carbohydrate selected from the group consisting of a stabilized rosin amine and the salts thereof said preservative being present in an amount within the range of about 0.25 and 10% of the weight of said carbohydrate.

4. An aqueous solution of a polysaccharide containing a preservative for the polysaccharide selected from the group consisting of a stabilized rosin amine and the salts thereof said preservative being present in an amount within the range of about 0.25 and 10% of the weight of the polysaccharide.

5. An aqueous solution of a monosaccharide containing a preservative for the monosaccharide selected from the group consisting of a stabilized rosin amine and the salts thereof said preservative being present in an amount within the range of about 0.25 and 10% of the weight of the monosaccharide.

6. An aqueous solution of starch containing a preservative for the starch selected from the group consisting of a stabilized rosin amine and the salts thereof said preservative being present in an amount within the range of about 0.25 to 10% of the weight of the starch.

7. An aqueous solution of a polysaccharide containing a preservative for the polysaccharide selected from the group consisting of dehydrogenated rosin amine and the salts thereof said preservative being present in an amount within the range of about 0.25 and 10% of the weight of the polysaccharide.

8. An aqueous solution of a monosaccharide containing a preservative for the monosaccharide selected from the group consisting of dehydrogenated rosin amine and the salts thereof said preservative being present in an amount within the range of about 0.25 and 10% of the weight of the monosaccharide.

9. An aqueous solution of starch containing a preservative for the starch selected from the group consisting of dehydrogenated rosin amine and the salts thereof said preservative being present in an amount within the range of about 0.25 and 10% of the weight of the starch.

10. An aqueous solution of starch containing as a preservative for the starch dehydrogenated rosin amine in an amount within the range of about 0.25 and 10% of the weight of the starch.

11. An aqueous solution of starch containing as a preservative for the starch a salt of dehydrogenated rosin amine in an amount within the range of about 0.25 and 10% of the weight of the starch.

12. An aqueous solution of starch containing as a preservative for the starch dehydrogenated rosin amine acetate in an amount within the range of about 0.25 and 10% of the weight of the starch.

EDWARD A. BRIED.

REFERENCES CITED

The following references are of record in the file of this patent:

Borglin Soap and San. Chem. Dec. 1947, p. 147, 149, 167, 3 pages.